US008632319B2

(12) United States Patent
Raymond (10) Patent No.: US 8,632,319 B2
(45) Date of Patent: Jan. 21, 2014

(54) DEVICE FOR POWERING THE PUMP OF A ROCKET ENGINE USING AN INERTIA WHEEL

(75) Inventor: Gerald Raymond, Medard en Jalles (FR)

(73) Assignee: Astrium SAS, Suresnes (FR)

( * ) Notice: Subject to any disclaimer, the term of this patent is extended or adjusted under 35 U.S.C. 154(b) by 376 days.

(21) Appl. No.: 12/681,978

(22) PCT Filed: Oct. 3, 2008

(86) PCT No.: PCT/EP2008/063283
§ 371 (c)(1),
(2), (4) Date: Sep. 16, 2010

(87) PCT Pub. No.: WO2009/047218
PCT Pub. Date: Apr. 16, 2009

(65) Prior Publication Data
US 2011/0017873 A1     Jan. 27, 2011

(30) Foreign Application Priority Data
Oct. 8, 2007    (FR) ...................................... 07 58133

(51) Int. Cl.
*F04B 49/00*     (2006.01)
*F04B 23/08*     (2006.01)
*F04B 9/14*      (2006.01)

(52) U.S. Cl.
USPC .......................... 417/223; 417/321; 417/374

(58) Field of Classification Search
USPC .............. 417/223, 321, 374; 244/135 R, 165, 244/171.1, 172.2
See application file for complete search history.

(56) References Cited

U.S. PATENT DOCUMENTS

| | | | | | |
|---|---|---|---|---|---|
| 4,084,924 | A | * | 4/1978 | Ivanoff et al. | 417/423.12 |
| 4,172,692 | A | * | 10/1979 | Everett | 417/45 |
| 4,723,735 | A | * | 2/1988 | Eisenhaure et al. | 244/165 |
| 4,888,949 | A | * | 12/1989 | Rogers | 60/434 |
| 5,462,402 | A | * | 10/1995 | Bakholdin et al. | 415/90 |
| 6,113,033 | A | * | 9/2000 | Parks et al. | 244/165 |
| 6,202,782 | B1 | * | 3/2001 | Hatanaka | 180/301 |
| 6,454,218 | B1 | * | 9/2002 | Jacobson | 244/165 |
| 6,457,306 | B1 | | 10/2002 | Abel et al. | |
| 6,615,586 | B1 | * | 9/2003 | Boric | 60/729 |
| 7,472,544 | B1 | * | 1/2009 | Knight | 60/257 |
| 2006/0249067 | A1 | * | 11/2006 | Rayner et al. | 114/238 |

OTHER PUBLICATIONS

Christopher et al, "Flywheel Technology Development Program for Aerospace Applicatins", Jun. 1998, IEEE AES Systems Magazine, pp. 9-14.*

* cited by examiner

*Primary Examiner* — Charles Freay
(74) *Attorney, Agent, or Firm* — IM IP Law PLLC; C. Andrew Im (57) ABSTRACT

An apparatus for driving a pump for fueling a rocket engine of a space vehicle. The apparatus comprises an inertia wheel and a transmitting device to transmit a rotation of the inertia wheel to the pump. The apparatus further comprises a measuring device to measure the rotation speed of the inertia wheel a clutching device to decouple the wheel and the pump for a speed lower than a pre-determined speed lower, which is lower than the nominal rotation speed of the wheel. The invention is particularly applicable to a space vehicle comprising a rocket engine wherein the fuel supply system comprises at least one pump driven by the apparatus of the invention and a starting device to start the apparatus while the space vehicle is in flight.

19 Claims, 7 Drawing Sheets

DEVICE FOR POWERING THE PUMP OF A ROCKET ENGINE USING AN INERTIA WHEEL

RELATED APPLICATIONS

This application is a §371 application from PCT/EP2008/063283 filed Oct. 3, 2008, which claims priority from French Patent Application No, 07 58133 filed Oct. 8, 2007, each of which is herein incorporated by reference in its entirety.

TECHNICAL FIELD OF THE INVENTION

The present invention relates to a device and a method for driving the pump of a rocket engine using an inertia wheel. The technical field to which the present invention relates is that of high-thrust rocket propulsion, like that required for a space launcher.

BACKGROUND OF THE INVENTION

For this type of application, there are three families of technologies, depending on the physical state of the propellants used: solid propulsion, wherein the propellant is stored in a combustion chamber, liquid propulsion, which can use one, two or even more propellants, wherein propellants must be transferred from storage tanks to a combustion chamber, and hybrid propulsion, which uses a liquid propellant and a solid propellant, and wherein a liquid propellant must be transferred to a combustion chamber in which a solid propellant is stored.

The present invention relates more precisely to devices for transferring liquid propellants to the combustion chamber and more specifically to the drive system for this transfer.

In order to be capable of providing high thrust, rocket engines must run at a high pressure of several tens of bar, for example from 30 to 50 bar for Ariane engines, with a high flow of matter.

In the case of liquid propulsion, it is the propellant feed system that must provide this flow and this pressure. Two methods are commonly used to produce this pressurized feed: direct pressurization of the propellant tanks and pumping with pumps from a low-pressure tank.

The first solution has the virtue of simplicity, but requires tanks capable of withstanding high pressures, which creates problems in terms of mass and safety. This solution is limited in practice to low-power engines, such as attitude control engines or the upper stages of launchers for example, where installing an external means of pressurization is less advantageous.

The second solution requires the use of specific pumps capable of producing the substantial flow required by the engines. This flow, combined with the huge increase in pressure required, results in pumps of considerable power, from several hundred kilowatts to several megawatts.

In current and past space launchers, these pumps are systematically driven by turbine engines, generally using the same propellants as the main engine.

These turbines are driven by hot gases. These hot gases are generally produced by taking a portion of the propellants for the rocket engine and burning these portions in a specific small combustion chamber. They can also be produced by a gas generator, often a small powder rocket.

The turbine/pump assembly is called a turbopump. A turbopump is a complex, fragile object because it must transmit very high levels of power—several megawatts—using very high rotation speeds, for example from 10,000 to 30,000 rpm, which exerts very high mechanical stresses on the materials.

In addition, being driven by hot gases resulting from combustion produces very high temperatures in the turbine and very large temperature gradients in the transmission shafts between the turbine and the pump.

This thermal gradient effect is further accentuated when the propellants are cryogenic, the pump temperature being several tens of degrees Kelvin while only a few centimeters away, the temperature of the driving centrifugal turbine is more than 1,000 degrees Celsius.

Lastly, because of these extreme operating conditions, starting a turbopump is difficult, with one part being cooled, the other being heated, and the assembly being brought to rotation gradually enough not to cause an even higher transient gradient capable of rupturing the turbopump.

Ultimately, a turbopump is a very expensive object with a short life, used in conventional launchers which have a short operating life that is measured in minutes.

In reusable launchers like the space shuttle, the turbopumps must be replaced for nearly every flight, which is quite onerous in terms of maintenance costs.

One proposed solution for replacing a turbopump is described in the document U.S. Pat. No. 6,457,306.

This document describes replacing the drive turbine of the pump with an electric motor powered by batteries or other devices such as inertia wheels.

OBJECT AND SUMMARY OF THE INVENTION

Thus, there is no longer a need for a small rocket engine driving a turbine, less propellant is consumed, there are no longer such high temperature gradients, and the assembly is more reliable and better adapted to a reusable launcher.

It is also possible to adjust the rotation of the electric motor and thus easier to vary the propellant flows, and hence the thrust; it is also easier to control the start of the pump so as to prevent excessively high transient gradients.

On the other hand, the energy source that powers the engine must be capable of supplying a power that is measured in megawatts during the thrust phase, which entails significant mass and size constraints for this energy source and for the means for powering the electric motor.

The energy storage and motor system is ultimately very heavy.

The object of the present invention is to provide a system for driving a propellant pump that is simple and reliable, weights less, can be started in flight, and can in particular be used in reusable propulsion systems.

To this end, the invention proposes replacing the turbine engine of the pump or the electric motor with a simple device, separate from the propellants, that can be started and controlled independently of the operation of the propulsion system of the vehicle, and accordingly provides for using a device with an inertia wheel set in rotation in advance to drive the pump.

More particularly, the invention relates to a device for driving a pump for fueling a rocket engine of a space vehicle, characterized in that it comprises an inertia wheel and a means for transmitting the rotation of the inertia wheel to the pump.

One of the main advantages of the inertia wheel is that it is simple to implement and that it directly stores mechanical energy.

Preferably, the transmission means is a common shaft between the inertia wheel and the pump.

Advantageously, the transmission means includes a device for modifying the drive ratio between wheel and pump.

According to a particular embodiment, the device includes a clutching device adapted for coupling and decoupling the inertia wheel and the pump.

According to an advantageous embodiment, the device includes an electric motor for starting the wheel.

The electric motor is powered either by an electrical source outside the vehicle, or by an electrical source inside the vehicle whereby the electric motor makes it possible to conserve energy in the inertia wheel after the takeoff of the vehicle.

According to a particular embodiment of the invention, the pump and the wheel are disposed inside the vehicle in a position that provides gyroscopic stabilization as a result of their rotation on at least one axis of the vehicle.

According to an alternative embodiment, the device includes at least one pair of identical wheels turning in opposite directions so as to neutralize the gyroscopic effects of the rotation of the wheels.

Advantageously, the device includes means for measuring the rotation speed of the wheel and means for decoupling the wheel and the pump for a speed lower than a given speed lower than the nominal rotation speed of the wheel.

According to an advantageous embodiment, the device includes means for controlling the flow rate of the pump comprising a device for bleeding off a variable quantity of the flow leaving the pump and returning this flow to the tank.

Alternatively or additionally, the device includes means for controlling the flow rate of the pump comprising a valve placed downstream from the pump.

In the latter case, the valve is preferably an adjustable valve placed at the outlet of the pump and adapted for maintaining a constant flow rate by opening gradually.

Advantageously, the wheel is disposed in a housing forming a shield between the wheel and the tank.

The invention also relates to a device for fueling a rocket engine characterized in that it includes at least two pumps, each driven by a device according to the invention, and a space plane comprising a rocket engine wherein the fuel supply system comprises at least one pump driven by a device according to the invention, and means for starting the device while the plane is in flight.

BRIEF DESCRIPTION OF THE DRAWINGS

Other features and advantages of the invention will be more clearly understood by reading the following description of a nonlimiting exemplary embodiment of the invention accompanied by the drawings, which represent.

DETAILED DESCRIPTION OF THE EMBODIMENTS

The invention relates to space vehicles and is particularly applicable to space planes.

Space planes are launchers capable of taking off from the ground like an airplane, then leaving the earth's atmosphere to reach outer space.

In space, these space planes use a non-air-breathing, rocket-type mode of propulsion. For their atmospheric flight, they use air-breathing propulsion systems such as jet engines.

An inertia wheel is, as its name indicates, an object that is made to turn around an axis and is used to store energy in a kinetic form. The stored energy increases with the square of the rotation speed of the wheel and in proportion to its mass.

To store the energy, the wheel is made to rotate as fast as possible, since the extraction of the energy slowing the rotation of the wheel.

Figure 1A:
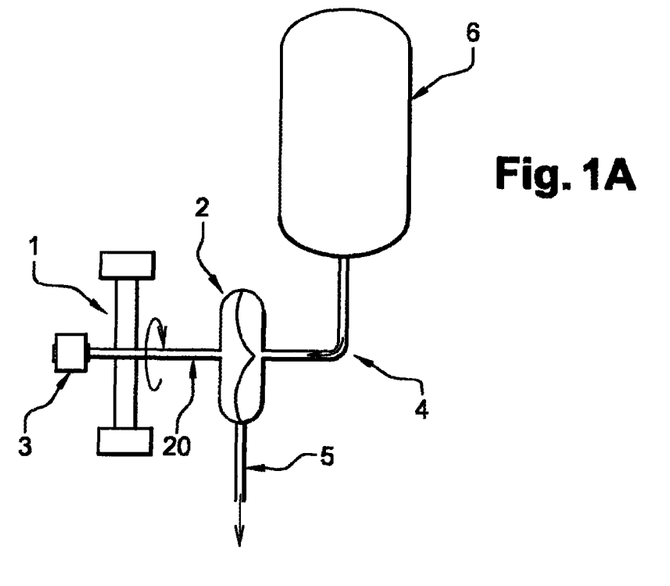
In FIG. 1A through 1F: a schematic representation of the principle of the device of the invention according to various embodiments.

In the simplified example according to the diagram shown in FIG. 1A, the wheel 1 is mounted on the same shaft 20 as the pump 2 it must drive. It is started prior to the takeoff of the vehicle by a starting motor 3, which is either powered by an external electrical source A1 as represented in FIG. 1C, or powered by an internal electrical source A2 as represented in FIG. 1D when the vehicle has an electrical generation system, as is the case for suborbital vehicles or space planes having conventional aeronautical engines, satellites with solar panels, or even launchers equipped with batteries.

When this electrical energy is available on board, the electric motor makes it possible after takeoff to conserve the wheel's nominal energy.

The pump 2 receives the propellant from the tank 6 via an inlet pipe 4 and sends the pressurized propellant through an outlet pipe 5 to a traditional rocket engine, not shown.

The friction on the bearings and in the air (the rotor of the pump is in rotation) are low enough to require only a modest amount of power, typically several tens of Watts.

In the case of a space plane, the designer of the vehicle can omit the internal electrical source if the time between takeoff and the start of the engine is short, for example typically less than an hour.

Once it arrives at the altitude at which the rocket engine is fired, the pump or pumps 2 are cooled, then the valves of the tanks are opened. The pressure from the tanks primes the pumps and the rocket engine is fueled by the latter, their rotation being maintained by the wheel.

Figure 2A:
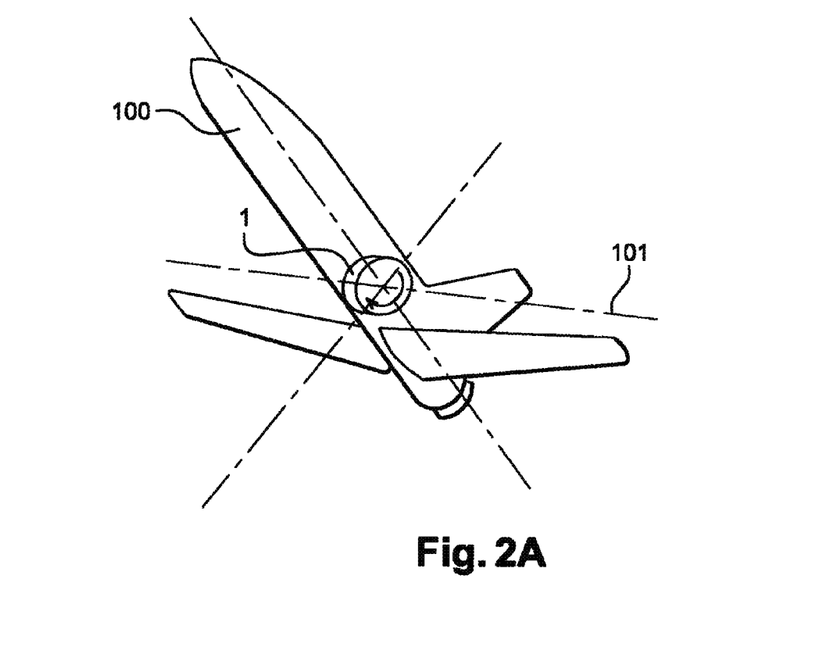
In FIGS. 2A and 2B: exemplary installations of one and two inertia wheels, respectively, in an aircraft.

After the propellants have been exhausted, the pump and the wheel continue to turn. It can be advantageous to leave them in motion during the exo-atmospheric flight, in order to benefit from the gyroscopic stabilization caused by their rotation. If for example as shown in FIG. 2A the wheel 1 is mounted on the pitch axis 101 of the vehicle 100, it will provide effective stabilization along the roll and yaw axes.

Thus, when the device is installed in a space plane, the mounting of the inertia wheel on the pitch axis will provide stability along the roll and yaw axes.

Pull-up maneuvers, on the other hand, will not be affected.

Figure 2B:
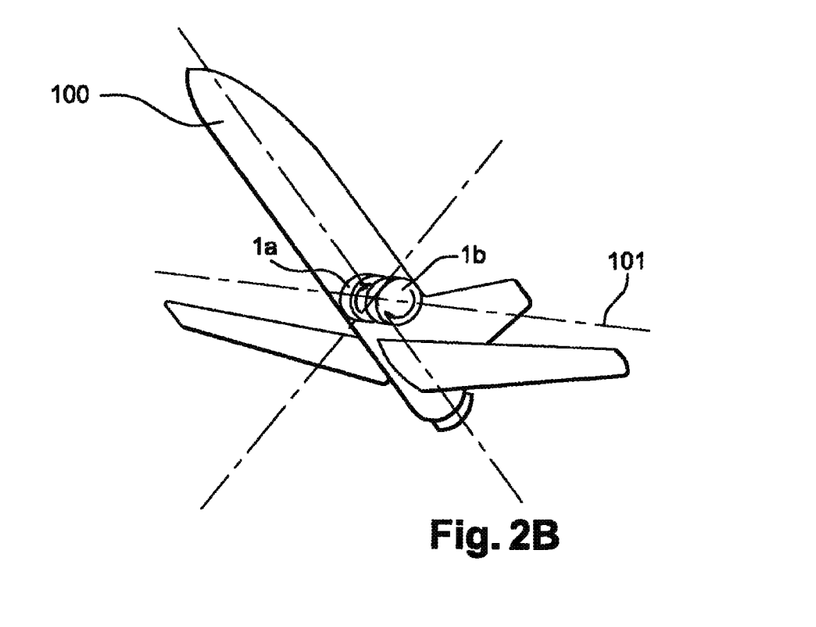

Conversely, it is possible to prevent gyroscopic effects by mechanically coupling two identical wheels turning in opposite directions, as represented in FIG. 2B where wheels 1a and 1b are positioned on the pitch axis 101 of the vehicle 100 and are counter-rotating.

The invention avoids the use of a turbine engine and the associated problems of starting it with or without the use of pyrotechnical means, the problems of fueling the turbine, and the problems of stabilizing the operation of the turbine coupled with the pump.

The inertia wheel, which by nature offers a stable rotation speed, also provides stabilized operation without requiring any adjustment other than that due to the compensation of the continuous deceleration of the wheel.

In addition, the device of the invention avoids the problems of coupling very hot and very cold areas on the same shaft.

One constraint of the inertia wheel system is the fact that the speed of the wheel decreases as the energy is extracted from it.

Figure 4:
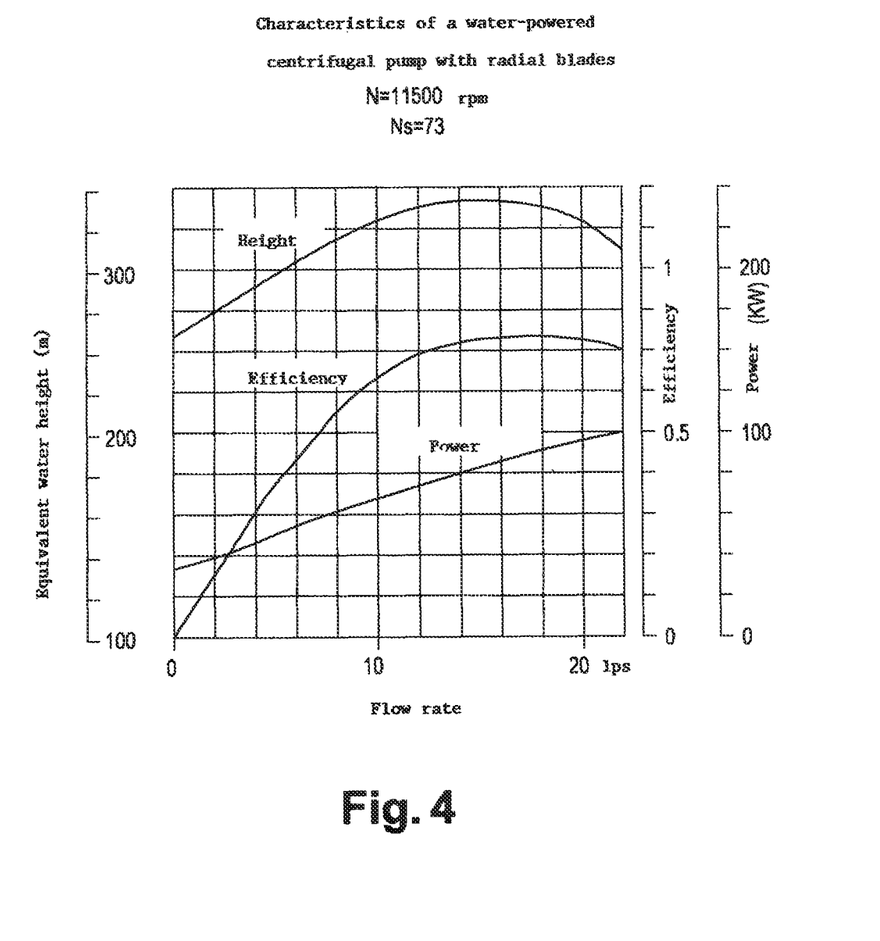
In FIG. 4: a graph of the characteristics of a centrifugal pump driven by the device of the invention.

FIG. 4 illustrates the operating parameters of a centrifugal pump with radial blades like those used to fuel rocket engines.

The flow rate of such a centrifugal pump is proportional to its rotation speed and the outlet pressure of the pump is proportional to the square of the rotation speed of the wheel.

The direct consequence when an inertia wheel is mechanically coupled with the pumps is that, since their flow rate is proportional to the rotation speed of the wheel, the flow rate therefore decreases in proportion to the reduction in the speed of the wheel, and the pressure decreases in proportion to the square of the decrease in the speed of the wheel as it slows.

In general, the fact that the flow rate decreases over time, and that hence the thrust decreases, is not directly disadvantageous because the mass of the vehicle also decreases due to the consumption of the propellants.

The decrease in the flow rate in such a case prevents a continuous increase in the acceleration of the vehicle.

This is only a disadvantage for rocket engines designed for an optimal operation based on a near constant flow rate.

Likewise, the decrease in the outlet pressure of the pump decreases the pressure in the combustion chamber. This phenomenon disturbs the operation of the engine less than the variations in the flow rate, but it does proportionally reduce the thrust.

To handle these problems, the invention provides several solutions, depending on the particular engine in question.

A first solution consists of reducing the speed range of the wheel from which power is extracted to run the pump.

Vmax is defined as the maximum speed reached by the wheel, 0.5 Vmax is half that speed, reached after a given rotation time of the wheel, and nVmax, n<1, is the speed relative to Vmax at a given moment.

Instead of extracting the energy between Vmax and 0.5 Vmax, it is possible to use the wheel only between Vmax and n.Vmax, n being greater than 0.5. In order for the required quantity of energy to be extracted from it, the wheel must store more energy, and therefore must be heavier.

Figure 1B:
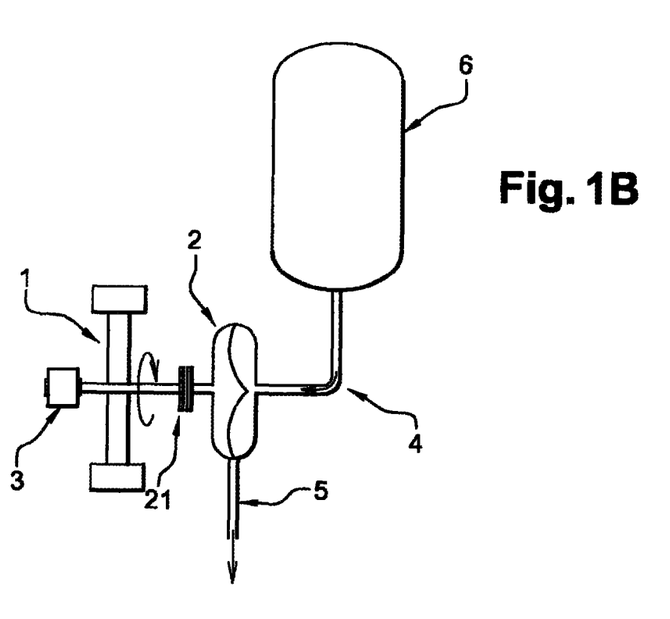
Figure 1C:
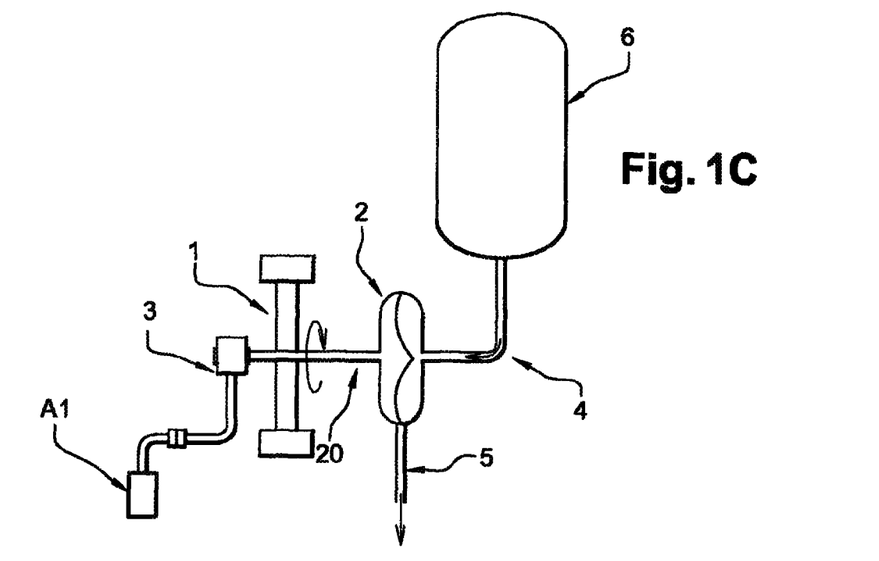
Figure 1D:
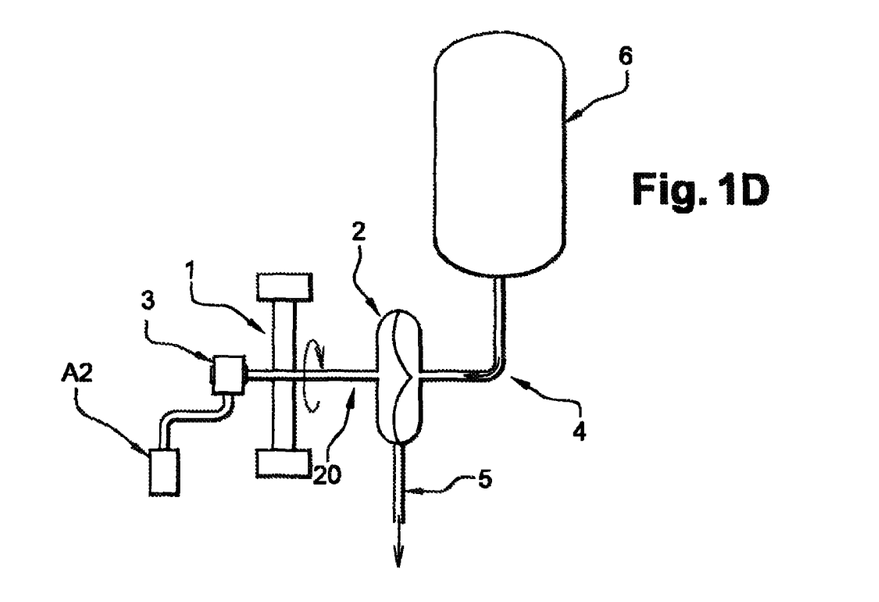

To put this method into practice, a clutch 21 is placed between the wheel and the pump as illustrated by FIG. 1B.

In this variant of the invention, the means for transferring the rotation of the wheel 1 to the pump 2 include half-shafts 2a, 20b which can be coupled and decoupled via the clutch 21.

This also makes it possible, in particular, to start the wheel 1 with the motor 3 while the pump is disengaged, using an external supply of electricity A1 before the flight, then during the flight, to couple the wheel and the pump in order to run the latter.

The clutch may be replaced or supplemented by a device for modifying the drive ratio between wheel and pump, such as a variable speed transmission for limiting the variation in the flow rate over a wider range of rotation speeds of the wheel.

Figure 1E:
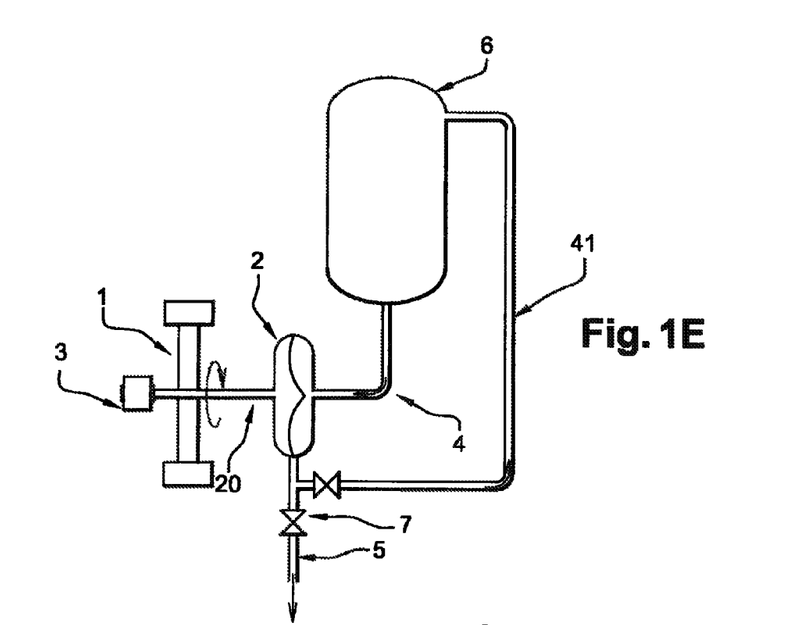

A second method for limiting the variation of the flow rate consists of using so-called "bypass" flow control, as represented by the embodiment of FIG. 1E.

This method of flow control consists of bleeding off a variable amount of flow by means of a valve 7 on the flow leaving the pump 2 and returning it to the tank 6 via a return line 41.

In the case of a speed variation from 100% to 50%, half of the flow is bled off at the beginning, and the bleed-off is decreased during operation down to a bleed-off of zero when the wheel reaches its maximum speed. In this case, some of the energy transmitted to the fluids is lost, but the overall result is still advantageous.

Experience has shown that instead of having 75% of the energy of the wheel, no more than 54% is available, which also leads to using a wheel of greater mass.

Given the increase in the mass of the wheel, these approaches only make sense if the rocket engine accepts no more than a 40 to 40% variation in flow rate.

A third method of flow control consists of controlling the flow rate using adjustable valves on the inlet and/or outlet pipes of the pump.

Figure 1F:
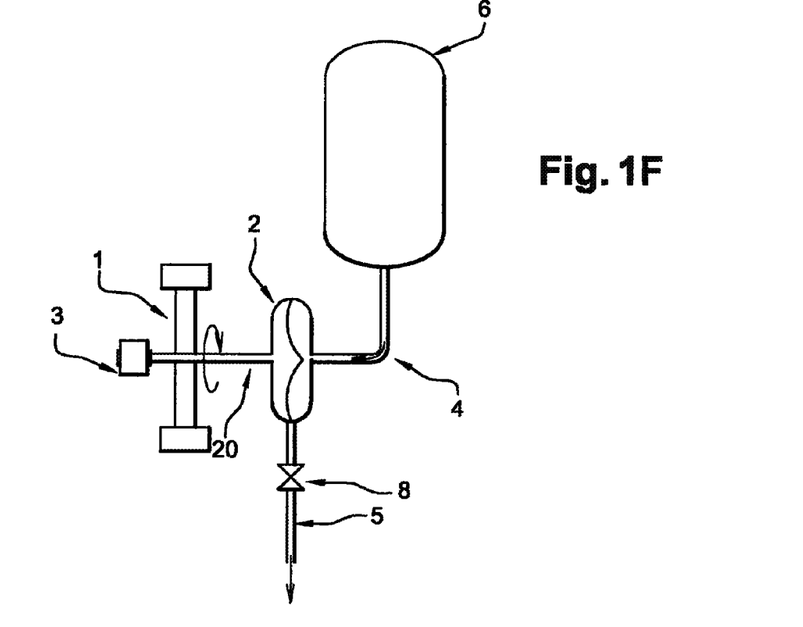

It is used in the exemplary embodiment illustrated in FIG. 1F, which includes a valve 8 on the outlet pipe 8 of the pump 2.

This method has an impact on the pressure delivered by the pump due to the variable head losses it induces.

It is nevertheless an effective solution when desiring to maintain a constant flow rate with a chamber pressure that decreases over time. In fact, an adjustable valve placed at the outlet of the pump makes it possible to adjust the flow while also creating a head loss. Assuming, for example, a wheel whose speed varies by a ratio 2 during the propelled flight, the pressure generated by the pump at the start of the flight is quadruple that generated at the end.

When the pump 2 is coupled with a valve 8 that maintains a constant flow rate by gradually opening until it is completely open at the end, the valve 8 absorbs half of the pressure through head loss, and reduces the flow rate by half.

The engine chamber is then fed at a nearly constant flow rate, with a pressure that decreases over time, which contributes to a reduction in the accelerations experienced by the vehicle during the flight.

Thus, based on the characteristics of the rocket engine to be fueled, the most suitable arrangement among the different variants defined in FIG. 1A through 1F will be used, while retaining the possibility of combining the features of these variants depending on the circumstances.

For purposes of an exemplary embodiment, the following hypotheses corresponding to a concrete embodiment in the case of a space plane will be considered:

The rocket engine uses liquid methane (LCH4) and liquid oxygen (LOx); it runs properly at a pressure of 15 to 30 bar; it runs for a period of about 80 seconds and requires 6 tons of propellants.

Furthermore, the pump speed is on the order of 15,000 rpm. This is the usual speed for LOx pumps.

In this example, a tank on the order of 2.5 m in diameter with a pressure of 5 bar is chosen, making it possible not to cause excessive structural stresses on such a tank.

In fact, assuming a skin of the tank on the order of 3 mm thick, a pressure of 5 bar results in a stress in the cylindrical main part of less than 200 MPa according to the equation $\sigma = PR/e$.

Assuming a tank built of 2219T87-type aluminum ($\sigma$ yield=407 MPa), this results in a safety factor greater than 2.

As seen above, the engine operates at a pressure of 30 bar at the start of the flight, and 15 bar at the end.

The chosen approach is to operate with a flow rate of the propellant flow that is adjusted to a constant value by means of the valve 8 placed downstream from the pump.

Figure 5:
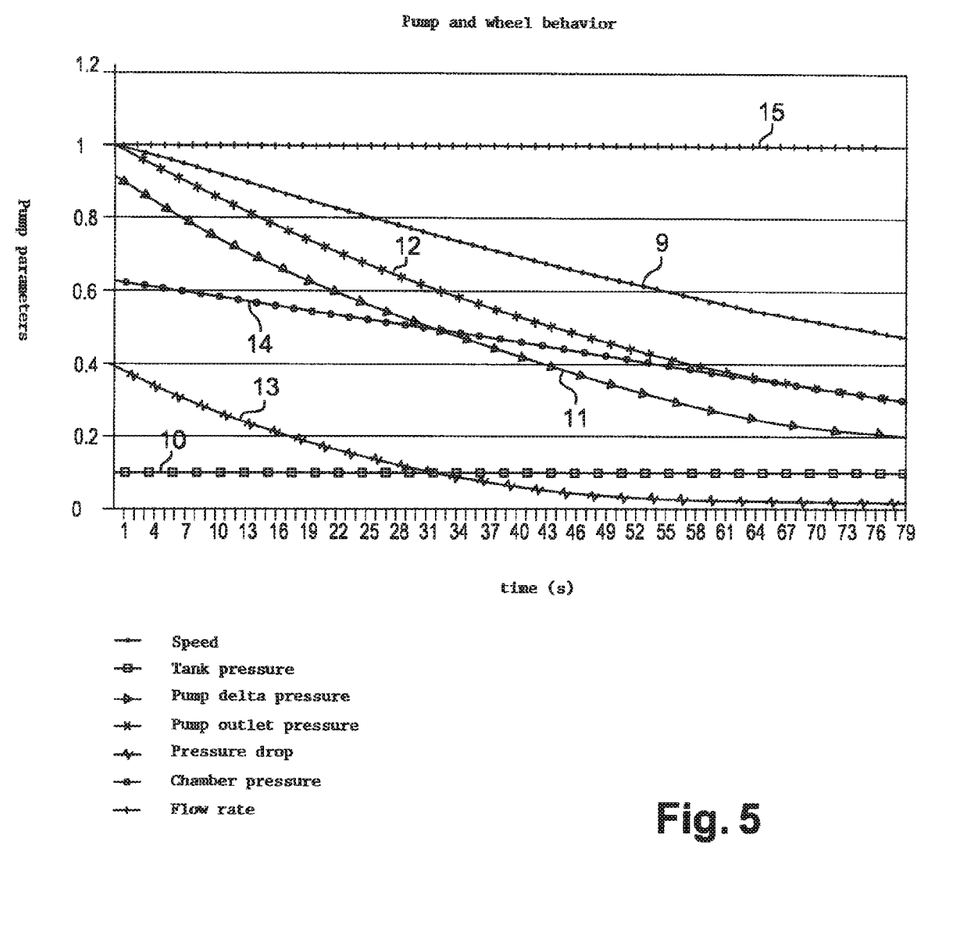
In FIG. 5: a graph representing the operating parameters of the device of the invention as a function of time.

The graph of FIG. 5 summarizes the behavior of the wheel and the pump in such a configuration.

The speed 9 of the wheel has been plotted relative to the initial speed; it decreases from 100% to 50%.

The pressures □ tank pressure 9, pump outlet pressure 12, feed pressure of the chamber 14 □ are plotted relative to the initial pump outlet pressure. It is noted that the head loss or pressure drop 13 imposed by the controlled valve is 40% at the start and decreases rapidly until it disappears at the end.

The feed pressure of the chamber 14 also decreases by half during propulsion, thus providing a decreasing amount of thrust which is compensated by the reduction in the mass of the vehicle generated by the propellant consumption. The propellant flow rate 15 is constant.

The efficiency of the pump is on the order of 70%, which is a conservative value.

Figure 3A:
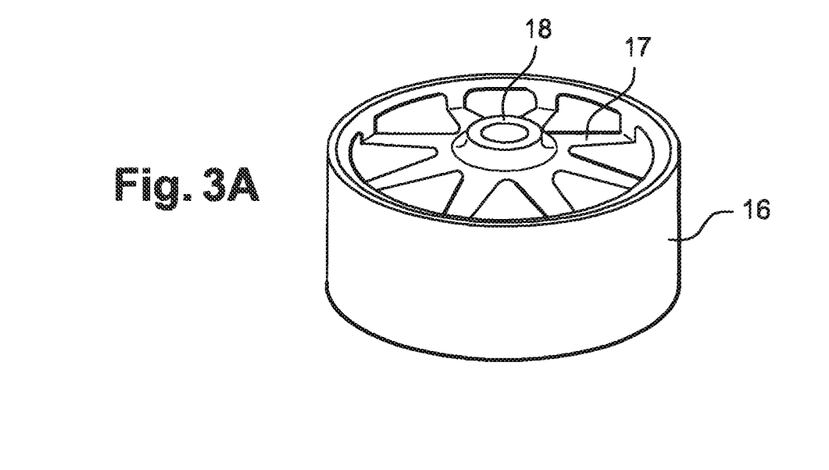
In FIG. 3A through 3C: exemplary embodiments of inertia wheels of the invention.
Figure 3B:
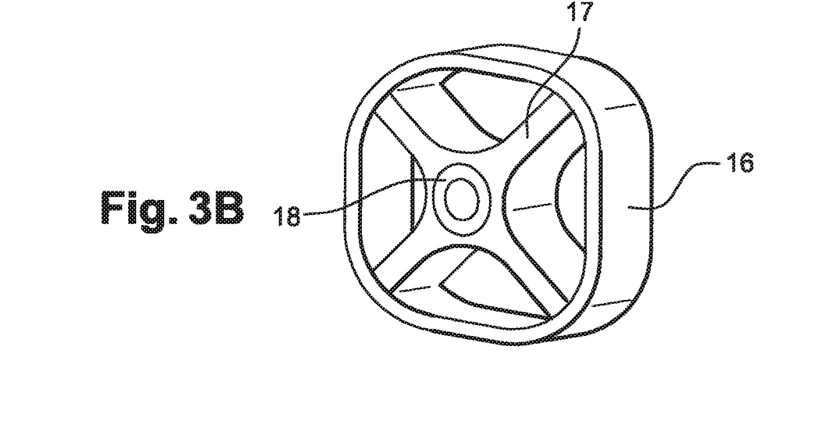
Figure 3C:
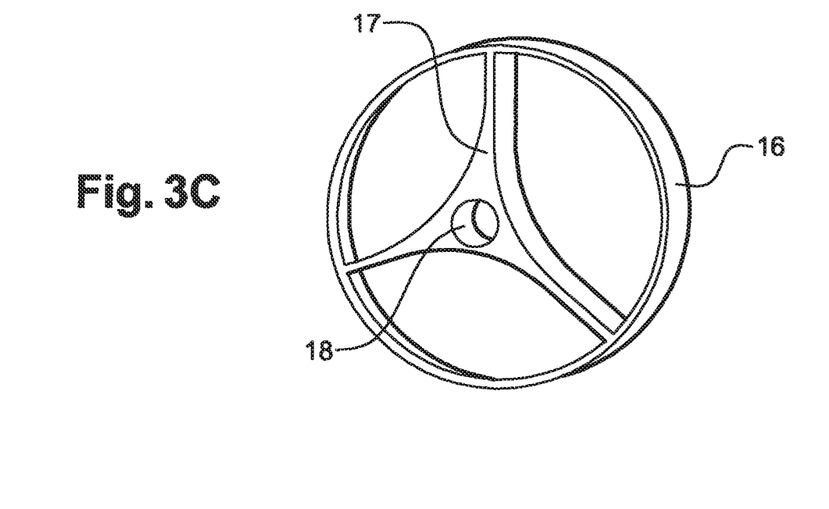

Exemplary embodiments of inertia wheels are shown in FIGS. 3A through 3C.

The wheel includes a band 16 which is made of high-strength carbon fiber with a breaking point of 2,300 Mpa, a density of approximately 1,750 g/dm3, having a maximum acceptable stress of 1,500 Mpa while maintaining a safety factor of 1.5, and includes a composite strip with a thickness and a width of approximately 10 cm.

It includes a rim 17 and a hub 18 for joining it to a rotating shaft, both made from a lightweight alloy.

The dimensions of the wheel are defined based on the necessary operating parameters of the rocket engine, and in particular the energy required to compress the propellants.

The mass of propellants to be compressed is on the order of 6,000 kg, which corresponds to a volume of approximately 7.5 m3.

Since the energy required to compress the propellants is first and foremost purely a function of the volume (E=V·ΔP), no distinction is made between the two propellants, and the mass of the wheel that will be capable of driving the LOx and LCH4 pumps is determined.

In such a fuel/oxidizer application, the wheel may be split in two so as to have one wheel per pump.

For a rotation speed of 15,000 rpm, the maximum acceptable diameter of the wheel is:

$$R = 1/\omega\sqrt{\rho} = 0.585 \text{ m}.$$

The energy required to compress the propellants is nominally expressed by the integral over the flow time multiplied by the pressure differential provided by the pump and by its efficiency. The calculation provides a value of approximately 24 MJ.

It should be noted that generating this energy requires a power of 580 KW at the start of the propelled phase.

Assuming that the energy of the wheel is harnessed between its full speed and the point at which it reaches a half-speed, 75% of its energy is available; it is therefore necessary for the wheel to store approximately 32 MJ, which under the conditions of the example results in a mass on the order of 80.5 kg.

It is appropriate to add to the mass of the inertia wheel the other masses in rotation (rim, shaft, pump rotor, electric drive motor rotor), which are estimated at some twenty kg overall, and the fixed masses (housing, electric motor stator, pump nozzle, pipes, etc.), also estimated at some twenty kg.

Although the masses in rotation also contribute to the low kinetic energy value, for the sake of simplicity they are not factored in.

In addition, regulations require that the wheel turn inside a housing that is capable of retaining any projectiles resulting from a rupture of the wheel. An estimate based on the "Punch equation" method of NASA standard SSP 52005B indicates that 2-kg composite fragments propelled at 900 m/s will be stopped by an 8-cm aluminum wall. This results in a housing comprising a 20- to 25-kg shield between the wheel and the tank.

In total, according to the example described, the device has an overall mass of approximately 150 kg for the assembly of pumps, wheel(s) and accessories.

In addition to the advantages of simplicity and reliability, the inertia wheel drive system makes it possible to avoid the constraints inherent in a technology that does not use a turbopump but uses pressurized propellant tanks.

The present invention makes it possible to eliminate the production complexity of such a solution with pressurized tanks, the development time required to produce them, their fragility, and problems due to the pressurization of these tanks.

The inertia wheel drive system of the present invention makes it possible to use low-pressure tanks which can be structural.

It should be noted that using pressurized tanks involves storing a gas for pressurizing the propellant tanks, and that structural tanks are tanks capable of providing the vehicle with longitudinal stability whereas other tanks must be fixed to a support frame.

The table below shows a comparison of three solutions that fulfill the function of storing 6 tons of propellants, with an average engine inlet pressurization of 25 bar, and a rocket stage approximately 5 m long.

|  | Structural aluminum tanks, 25 bar (kg) | Composite tanks 25 bar | Structural aluminum tanks, 5 bar |
| --- | --- | --- | --- |
| Tanks (kg) | 2,050 | 1,000 | 700 |
| Supports (kg) | 0 | 50 | 0 |
| Stage (5 m) (kg) | 50 | 500 | 50 |
| Pumps (kg) | 0 | 0 | 150 |
| Tank pressurization (kg) | 500 | 500 | 100 |
| Total (kg) | 2,600 | 2,050 | 1,000 |

The savings provided by the solution using low-pressure structural tanks with pumps driven by an inertia wheel is approximately 1 ton compared to the solution using high-pressure structural tanks.

The invention has applications in the field of astronautics, and more generally in all sectors using rocket engine propulsion with liquid propellants and in those in which a very high fluid flow rate is required for a relatively short time.

It is particularly advantageous when the propellants are cryogenic (liquid oxygen with liquid hydrogen, methane or kerosene), and particularly suitable for reusable suborbital vehicles for which the total mass of the pump assembly is not critical, and for which reliability and ease of maintenance are essential.

On the other hand, the present invention has many advantages such as the simplicity of its design, lower development and production costs, very high reliability, a stabilized pumping speed, and the very important possibility of reusing the pump assembly, whereas the current turbopumps are capable of being started no more than a few times.

The present invention has been described herein as an example in the context of the use of an inertia wheel to drive the rocket of a space plane. In such a vehicle, rocket propulsion is only used after an airplane-type flight.

However, the invention can be used for any application of a rocket engine, be it a launcher stage, an interplanetary vehicle or a satellite, insofar, of course, as the replacement of a turbopump fueling the rocket engine is advantageous.

The drawings provided are merely exemplary embodiments, and in particular, certain features described in FIG. 1A through 1F can be combined while remaining within the scope of the invention defined by the claims.

For example, it is possible to consider the use of a clutching device 21 according to FIG. 1B with an internal electric power supply for the motor 3 as in FIG. 1D or an external electric power supply as in FIG. 1C.

Likewise, a device comprising a flow control system using valves as represented in FIGS. 1E and 1F can be supplemented by a clutch 21 and an electric motor 3 with an internal or external power supply, the powering of the motor by an internal power supply making it possible to start the wheel in any flight phase with the pump disengaged, to fuel the rocket engine with the pump engaged, and then, when the rotation speed of the wheel is no longer sufficient, to disengage the pump and allow the wheel to operate as a freewheel in order to maintain gyroscopic stabilization.

The invention claimed is:

1. An apparatus for driving a rocket engine pump comprising a rotary pump delivering fuel to the rocket engine of the space vehicle, an inertia wheel and a transmitting device to transmit a rotation of the inertia wheel to directly drive the rotary pump to fuel the rocket engine of the space vehicle, wherein the inertia wheel and the pump are mechanically coupled through the transmitting device.

2. The apparatus for driving the rocket engine pump of claim 1, wherein the transmitting device comprises a shared shaft between the inertia wheel and the pump.

3. The apparatus for driving the rocket engine pump of claim 1, wherein the transmitting device comprises a clutching device adapted to couple and decouple the inertia wheel and the pump.

4. The apparatus for driving the rocket engine pump of claim 1, wherein the transmitting device comprises a device for modifying the drive ratio between the inertia wheel and the pump.

5. The apparatus for driving the rocket engine pump of claim 1, further comprising an electric motor for starting the inertia wheel.

6. The apparatus for driving the rocket engine pump of claim 5, wherein the electric motor is powered by an electrical source outside the space vehicle.

7. The apparatus for driving the rocket engine pump of claim 5, wherein the electric motor is powered by an electrical source inside the space vehicle and is configured to conserve energy in the inertia wheel after the takeoff of the space vehicle.

8. The apparatus for driving the rocket engine pump of claim 1, wherein the pump and the inertia wheel are disposed inside the space vehicle in a position to provide gyroscopic stabilization as a result of their rotation on at least one axis of the space vehicle.

9. The apparatus for driving the rocket engine pump of claim 1, further comprising at least one pair of inertia wheels turning in opposite directions to neutralize gyroscopic effects of the rotation of said at least one pair of inertia wheels.

10. The apparatus for driving the rocket engine pump of claim 9, wherein said at least one pair of inertia wheels is a pair of identical inertia wheels.

11. The apparatus for driving the rocket engine pump of claim 1, further comprising a measuring device to measure a rotation speed of the inertia wheel; and a clutching device to decouple the inertia wheel and the pump for a speed lower than a predetermined speed.

12. The apparatus for driving the rocket engine pump of claim 11, wherein the predetermined speed is lower than a nominal rotation speed of the inertia wheel.

13. The apparatus for driving the rocket engine pump of claim 1, further comprising a controller to control a flow rate of the pump, the controller comprising a device for bleeding off a variable quantity of a propellant flow leaving the pump and returning the propellant flow to a propellant tank.

14. The apparatus for driving the rocket engine pump of claim 1, further comprising a controller to control a flow rate of the pump, the controller comprising a valve placed downstream from the pump.

15. The apparatus for driving the rocket engine pump of claim 14, wherein the valve is an adjustable valve placed at the outlet of the pump and configured to maintain a constant flow rate by opening the adjustable valve gradually.

16. The apparatus for driving the rocket engine pump of claim 1, wherein the wheel is disposed in a housing forming a shield between the inertia wheel and a propellant tank.

17. A device for fueling a rocket engine of a space vehicle comprising at least one rocket engine pump driven by the apparatus for driving a rocket engine pump of claim 1; and low-pressure structural tanks.

18. A fueling apparatus, comprising a rocket engine of a space vehicle, at least two pumps, each pump being driven by a device comprising an inertia wheel and a transmitting device to transmit a rotation of the inertia wheel to directly drive said each pump to fuel the rocket engine of the space vehicle, wherein the inertial wheel and said each pump are mechanically coupled through said transmitting device.

19. A space vehicle comprising a rocket engine and a fuel supply system, the fuel supply system comprises at least one pump driven by a device for fueling the rocket engine and a starting device to start the device for fueling the rocket engine while the space vehicle is in flight; and wherein the device for fueling the rocket engine comprises an inertia wheel and a transmitting device to transmit a rotation of the inertia wheel to directly drive said at least one pump, wherein the inertial wheel and said at least one pump are mechanically coupled through said device.

* * * * *